United States Patent [19]

Hamer et al.

[11] 4,038,659
[45] July 26, 1977

[54] FREQUENCY AGILITY RADAR

[75] Inventors: Edward G. Hamer, Baltimore; Calvert F. Phillips, Jr., Annapolis, both of Md.

[73] Assignee: The United States of America as represented by the Secretary of the Air Force, Washington, D.C.

[21] Appl. No.: 578,935

[22] Filed: Sept. 9, 1966

[51] Int. Cl.² ............................................. G01S 7/28
[52] U.S. Cl. ............................. 343/17.1 R; 343/5 R; 343/17.2 R; 343/18 E
[58] Field of Search ........... 343/17.1 R, 18 E, 17.2 R, 343/5 R

[56] References Cited

U.S. PATENT DOCUMENTS

| | | | |
|---|---|---|---|
| 3,114,148 | 12/1963 | Lederman | 343/18 E |
| 3,163,862 | 12/1964 | Jenny | 343/18 E |

Primary Examiner—S.C. Buczinski
Attorney, Agent, or Firm—Joseph E. Rusz; George Fine

[57] ABSTRACT

A frequency agility radar having automatic electronic front end tuning in synchronism with the transmitter on a pulse to pulse basis is provided. The automatic electronic front end tuning is achieved by the use of a backward wave parametric amplifier. The frequency generated by the radar transmitter is employed to control the center frequency of backward wave amplifier. The backward wave amplifier operates as an electronically tuned filter with the center frequency of the tuner following the radar frequency accurately.

2 Claims, 1 Drawing Figure

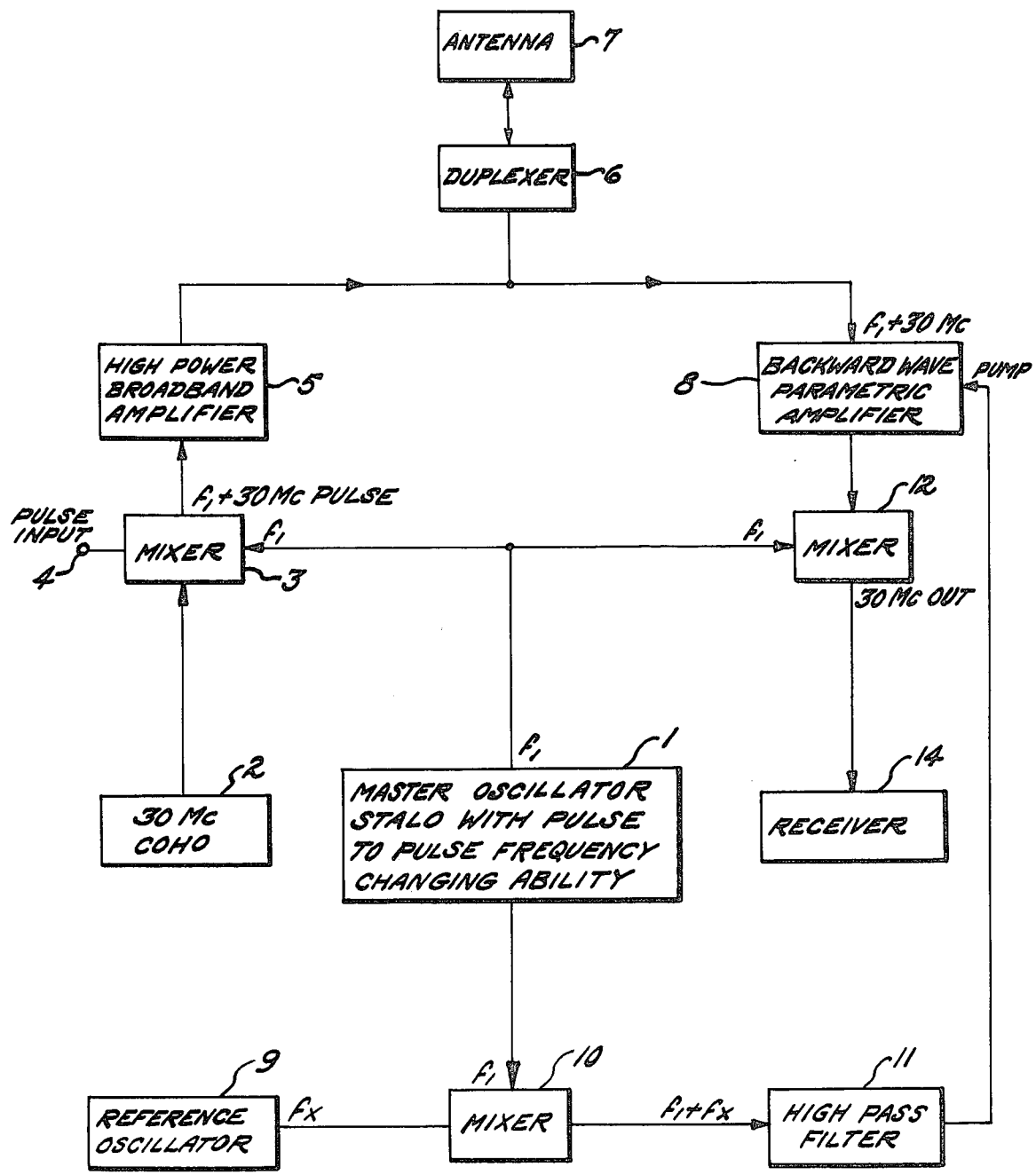

FREQUENCY AGILITY RADAR

The present invention relates to a frequency agility radar and more particularly to a frequency agility radar wherein automatic electronic front end tuning is utilized.

By changing the operating frequency of a radar system on a pulse basis in a random manner, many types of jamming may be readily defeated and, in general, the jamming aircraft must resort to broadband types of jamming. Forcing broadband or barrage jamming is desirable from the viewpoint that the effective watts/Mc against the radar is greatly reduced. It is important to note, however, that pulse to pulse frequency agility will not be effective as long as the front end of the radar system is tuned in synchronism with the transmitter on a pulse to pulse basis. Unless the front end is narrowband and tuned on a pulse to pulse basis, a high-power narrowband jammer, such as a CW (continuous wave) jammer could easily saturate the front end of the system and in this manner completely negate the advantages of the frequency agility system.

This invention presents a device which may be employed as electronically tuned narrowband front end filter, or the equivalent thereof, employing a parametric amplification technique, and which may automatically be tuned in synchronism with a pulse to pulse frequency agility radar transmitter system.

Backward wave electronic amplifiers are a development in the field of traveling wave amplifiers and backward wave amplifiers generally employ techniques whereby energy is transferred from an electron beam to the radio frequency field. Backwave amplifiers differ from forward wave amplifiers in that the backward wave amplifiers are narrowband devices. Backward wave amplifiers may be electronically tuned by varying an electrode voltage, which in turn makes them applicable to a frequency agility radar changing frequency on a pulse to pulse basis. There are, however, several disadvantages to the voltage tuned backward wave amplifier. One disadvantage is that an accurate control voltage must be generated which is a function of the transmitted radar frequency. Another is that for a radar system employing multiple receiving channels, the tubes must be matched or compensation must be made in the tuning voltage for each backward wave amplifier. Neither of the above-listed difficulties is unsurmountable but it would be desirable to determine new and easier techniques.

In the field of parametric amplification, where signal amplification takes place by "pumping" a nonlinear element by means of an externally applied radio frequency source at a different frequency from that of the signal frequency, the externally applied radio frequency source would be ideal in terms of controlling the front end tuning of a radar system having pulse to pulse frequency agility. Forward wave amplification has been achieved by applying the pump frequency to the electron beam of a traveling wave amplifier, and to the nonlinear reactance of a traveling wave amplifier using junction diodes. It was suggested by P. K. Tien in a paper on parametric amplification (P. K. Tien "Parametric Amplification and Frequency Mixing in Propagating Circuits", Journal of Applied Physics, Vol. 29, pp 1347-1357 September 1959), that backward wave parametric amplification should be possible in the case where narrow bandwidths are desirable. The Airborne Instruments Laboratory constructed a low frequency version of such a backward wave parametric amplifier, based upon Tien's paper, using variable reactance junction diodes, and this backward wave parametric amplifier is described in a recent article (D. I. Breitzer and E. W. Sard, "Low Frequency Prototype Backward Wave Reactance Amplifier", The Microwave Journal, pp 34-37, Vol. 2, No. 8, August 1959).

Based upon the information described above, the present invention utilizes a backward wave parametric amplifier which is ideal for use with a radar system employing pulse to pulse frequency changing. The frequency generated by the radar transmitter is employed to control the center frequency of the front end backward wave amplifier. The amplifier is of the type described in the above-referenced article (D. I. Breitzer and E. W. Sard, "Low Frequency Prototype Backward Wave Reactance Amplifier", The Microwave Journal, pp 34-37, Vol. 2, No. 8, August 1959), employing variable reactance diodes or could be of the type where the pump frequency is applied to the electron beam of a conventional backward wave amplifier. The latter technique is not discussed in any of the references and appears as a natural extension of the parametric technique at microwave frequencies, where narrow passbands are required and voltage tuning becomes difficult.

Two other natural benefits are derived from the use of backward wave parametric amplifiers for front end filters. One is that parametric amplification introduces very little noise into the front end of the receiving system (the original purpose of parametric amplification) thereby increasing the range of the radar system in a nonjamming environment. The other is that all types of parametric amplifiers can stand higher transmitter power leakage through the radar duplexer without burnout than can a conventional junction diode mixer front end.

An object of the invention is to provide a radar system employing pulse to pulse frequency changing wherein the front end of the radar is tuned in synchronism with the transmitter.

Another object of the present invention is to provide a frequency agility radar wherein the front end of the radar system is tuned in synchronism with the transmitter on a pulse to pulse basis.

Various other objects, advantages and features of novelty which characterize the invention are pointed out with particularity in the claims annexed hereto and forming a part hereof. However, for a better understanding of the invention, its advantages, and objects attained by its use, reference should be had to the subjoining drawing, which forms a further part hereof, and to the accompanying descriptive matter, in which there is illustrated and described a preferred embodiment of the invention. In the single drawing there are shown three oscillators which are employed in the transmitter driver chain. Main or master oscillator 1 generates a specific STALO (stabilized local oscillator) frequency, shown as output signal $f_1$. This frequency is chosen in a random manner by sampling a noise source preceding frequency selector. A typical example of such a system is the use of a voltage tunable magnetron whose output frequency is a linear function of its input control voltage. The input voltage is determined by the sampled noise source; consequently its output frequency is selected in a completely random manner within the selected operating frequency range of the system. This is a conventional practice.

The second oscillator is a 30 megacycle (Mc) COHO (coherent oscillator) 2. The 30 Mc frequency of oscillation is not mandatory but rather is a typical value. The COHO 30 Mc output signal is mixed with the output signal ($f_1$) of the master oscillator in pulsed mixer 3. Mixer 3 also receives preselected pulses by way of input terminal 4. The upper sideband ($f_1 + 30$ Mc) pulsed output then becomes the frequency of the transmitted pulse for the radar system and is fed to antenna 7 for transmission by way of high power broadband amplifier 5 and duplexer 6. The transmitted pulse is directed toward targets so as to provide return echoes therefrom.

The system description to this point is of a typical advanced radar system mode of frequency generation and transmission such as in the Westinghouse AN/FPS-27 radar.

It is desirable to have an electronically tuned narrowband filter which automatically follows the selected operating frequency of the radar to eliminate all external interference from the input to the radar receiver other than that received at the operating frequency of the radar. The elimination of such "off-frequency" interference, should it exist, can greatly improve the operating performance of the radar, especially under conditions of enemy countermeasures. To provide this protection to the radar receiver in a broadband radar system which has the capability of changing frequency on each transmitted pulse it is necessary to employ an electronically tuned rather than a mechanically tuned filter. Further, it is necessary to have the center frequency of the filter follow the radar frequency very accurately. The invention provides a method of achieving the effect of an electronically tuned narrowband filter by the use of a backward wave parametric amplifier. The backward wave parametric amplifier (BWPA) type can be considered as a narrowband filter whose passband center frequency is controlled by the frequency of its "pump". The backward wave parametric amplifier then becomes an electronically tuned filter which can be instantaneously tuned to the operating frequency of the radar by the selection of its pump frequency.

Tuning of backward wave parametric amplifier 8 such that it follows the transmitted frequency of the radar is achieved as follows:

The third oscillator is reference oscillator 9 which generates a preselected signal having a frequency, $fx$. This signal of frequency, $fx$, is mixed in mixer 10 with the output signal of master oscillator 1 which has a frequency of $f_1$. The upper sideband signal of $fx + f_1$ from mixer 10 is supplied as the pump frequency to backward wave parametric amplifier 8. Thus it is seen that the pump frequency is automatically changed in accordance with the changing radar frequency due to the change in the upper sideband frequency associated with the change in signal $f_1$. High pass filter 11 serves to remove signals containing $f_1$, $fx$ and $f_1 - fx$ as well as other undesired frequencies from the input to backward wave parametric amplifier 8.

It is to be noted that the return echo signal, $f_1 + 30$ Mc, received by antenna 7 is fed to backward wave parametric amplifier 8 by way of duplexer 6. The output signal, $f_1 + 30$ Mc, from backward wave parametric amplifier 8 is fed to mixer 12. Mixer 12 also simultaneously receives the output signal, $f_1$, from master oscillator 1, thus the final 30 Mc output to receiver 14 is achieved. An additional advantage of the present system resides in the fact that backward wave parametric amplifier 8 is also a low noise receiver.

Numerous objects and advantages of the invention have been set forth in the foregoing description, together with details of the structure and function of the invention and the novel features thereof are pointed out in the appended claims. This disclosure, however, is illustrative only, and changes may be made in detail especially in matters of shape, size, and arrangement of parts, within the principle of the invention to the full extent indicated by the broad general meaning of the terms in which the appended claims are expressed.

What we claim is:

1. A frequency agility radar system comprising a first oscillator having a predetermined frequency range, said first oscillator generating a first output signal with the frequency thereof selected in a random manner, a second oscillator generating a second signal having a preselected frequency, first pulsed mixer means receiving said first and second signals and providing an upper sideband pulsed output signal, means to transmit said upper sideband pulsed output signal toward preselected targets to provide return echo signals therefrom, a backward wave parametric amplifier, means to feed said backward wave parametric amplifier said return echo signals, means for tuning said backward wave parametric amplifier automatically to follow the transmitted signal frequency, said automatic tuning means including a third oscillator generating a third signal of preselected frequency, second mixer means receiving said first signal and said second signals, means to filter the output signal from said second mixer means to provide only the upper sideband signal pump frequency to said backward wave parametric amplifier for tuning thereof, third means to mix the output signal from said backward wave parametric amplifier and said first signal to provide an output signal, and receiver means being fed the output signal from said third mixer means.

2. A frequency agility radar system as defined in claim 1 wherein means to feed said backward wave parametric amplifier return echo signals consists of an antenna receiving said return echo signals and a duplexer interconnecting said antenna and said backward wave parametric amplifier.

* * * * *